Sept. 29, 1964 W. J. HARRISON 3,150,534
APPARATUS FOR REMOVING THE EFFECT OF BACKLASH IN GEAR DRIVES
Original Filed Sept. 8, 1960 3 Sheets-Sheet 1

INVENTOR.
Walter J. Harrison
BY
HIS ATTORNEYS

Sept. 29, 1964 W. J. HARRISON 3,150,534
APPARATUS FOR REMOVING THE EFFECT OF BACKLASH IN GEAR DRIVES
Original Filed Sept. 8, 1960 3 Sheets-Sheet 3

INVENTOR.
Walter J. Harrison
BY
Webb, Mackey & Burden
HIS ATTORNEYS

United States Patent Office 3,150,534
Patented Sept. 29, 1964

3,150,534
APPARATUS FOR REMOVING THE EFFECT OF BACKLASH IN GEAR DRIVES
Walter J. Harrison, Pittsburgh, Pa., assignor to Fisher Scientific Company, Pittsburgh, Pa., a corporation of Pennsylvania
Continuation of application Ser. No. 54,791, Sept. 8, 1960. This application Apr. 24, 1962, Ser. No. 191,676
2 Claims. (Cl. 74—409)

This application relates to new and useful improvements in apparatus for removing the effect of backlash in gear drives. More particularly, it relates to a circuit employed in apparatus wherein an element of the apparatus is given a reciprocating movement and is driven through a gear drive. The circuit makes it possible to start the movement of the element from the same position each time, although there has been a reversal in the direction of movement of the element between starts. This application is a continuation of my copending application Serial No. 54,791 filed September 8, 1960, now abandoned.

In many mechanisms, an element is moved back and forth in a reciprocating motion by a gear drive or it drives another element through a gear drive. Regardless of the precision with which the gears in the gear drive are cut, there will always be some backlash which must be taken into account if the distance the element is moved is to be measured with a high degree of precision after the direction of its movement has changed. I have invented a circuit wherein the effect of the backlash of the gear drive developed by a change in direction is eliminated. The element can then be moved in a direction away from the point where the direction of movement changed and the extent of the movement can be precisely determined or measured.

My circuit is particularly useful in automatic titration equipment wherein a titrant is fed into a reaction vessel until a desired end point is obtained and wherein it is necessary to know precisely the amount of titrant which has been delivered. Therefore, my invention will be described with reference to such automatic titrating equipment, but it is to be understood that it may be used in other apparatus wherever an element is moved in a reciprocating motion through a gear drive or the element drives another element through a gear drive and it is necessary to avoid the effects of backlash in the gear drive.

In the accompanying drawings, I have illustrated certain presently preferred embodiments of my invention in which.

Figure 1:
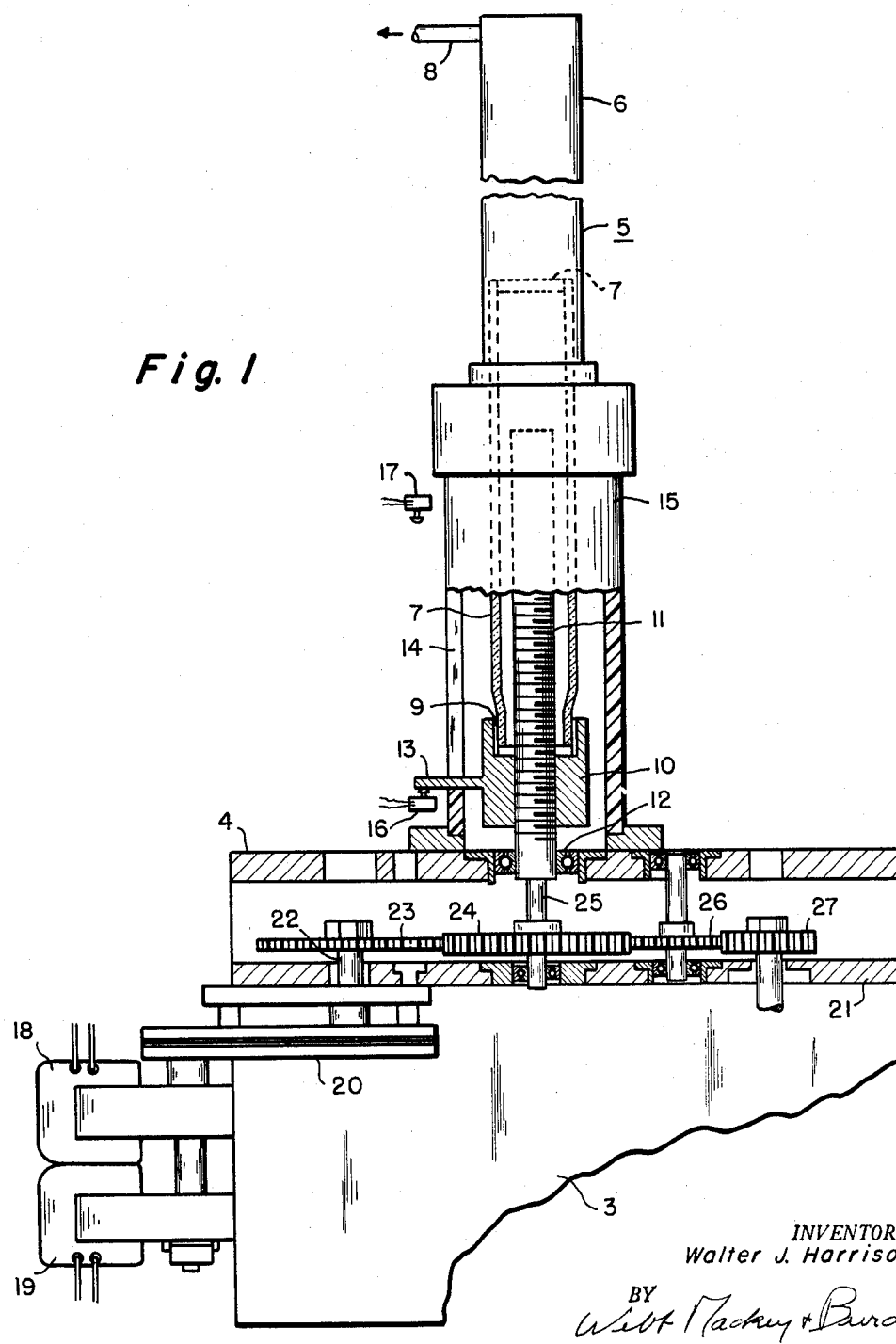
FIGURE 1 is a front view, partially in section, of a portion of automatic titrating apparatus in which my invention may be employed.

FIGURE 1 shows apparatus which may be used to supply measured volumes of a titrant solution to the reaction cell of an automatic titrator. The apparatus comprises a base 3 having a top 4 which supports a syringe, designated generally by the reference number 5, which supplies titrant solution to a reaction vessel in measured volumes.

The syringe 5 includes a cylinder 6 within which moves a glass plunger 7. The end of the cylinder has a connecting pipe 8 through which titrant solution can be drawn into the syringe and expelled from the syringe in accordance with signals received from other elements in the automatic titrator. The timing of these signals and the manner in which they are delivered form no part of the present invention.

The plunger 7 is a glass cylinder closed at one end within the cylinder 6 and is supported at its open end in a recess 9 formed in the top of a traveling nut 10.

The nut 10 rides on a lead screw 11 which is mounted in bearings 12 in the top 4 for rotation about a vertical axis. The lead screw is turned in one direction to raise the nut 10 and the plunger 7 in the cylinder 6 and thereby dispenses titrant from the cylinder 6 and turned in the opposite direction, to lower the plunger 7 and thereby fill the cylinder 6. To prevent the nut 10 from turning with the lead screw 11, the nut has an arm 13 which extends out through a vertical slot 14 in the side of a casing 15 which supports the cylinder 6. A lower limit switch 16 and an upper limit switch 17 are positioned in the path of travel of the arm 13 adjacent each end of its path of travel. The switch 16 forms part of a circuit hereinafter described and the switch 17 is added as a safety measure.

Two motors 18 and 19 connected to a common gear reducer 20 are used to turn the lead screw 11, the motor 18 driving the screw in one direction and the motor 19 driving the screw in the opposite direction. Two motors are used because of the simplicity of construction of single direction motors, but one single reversing motor could be used in place of the two motors.

A platform 21 extending beneath the top 4 supports gears which connect the gear reducer 20 with the lead screw 11. A shaft 22 extending from the gear reducer 20 carries a gear 23 which meshes with a gear 24 mounted on an extension 25 of the lead screw 11. The gear 24 also meshes with an idler gear 26 which, in turn, drives a gear 27. The shaft on which the gear 27 is mounted can be directly connected to conventional recording mechanism whereby the amount of titrant dispensed from the cylinder 6 during upward movement of the plunger 7 can be recorded. Alternatively, the shaft on which the gear 27 is mounted can drive a data transmitter, or shaft encoder, etc., connected electrically to a recorder. Since such arrangements are conventional, they are not shown.

It is obvious that if any precision is to be obtained in the measurement of the amount of titrant which is dispensed from the syringe, the interior diameter of the cylinder 6 and the exterior diameter of the plunger 7 must be closely controlled. Also, the amount of movement of the plunger 7 must be carefully measured. Also, to avoid resetting of the recording mechanism, the upward movement of the plunger should start at the same point each time titrant is dispensed. This cannot be done if the plunger starts its upward dispensing stroke at the end of its downward fill stroke unless the effect of backlash in the gear drive and in the gearing which connects the lead screw with the recording mechanism is eliminated. The circuit which I have invented eliminates this backlash effect and starts the plunger on its dispense stroke at precisely the same point each time it makes the stroke by automatically reversing the direction of the lead screw 11 when the nut 10 is at the end of its travel on a filling stroke of the plunger 7 and deenergizing the drive for the lead screw when in this opposite direction as soon as free play in the gearing and in the nut and lead screw has been removed during the reverse movement of the nut 10.

Figure 2:
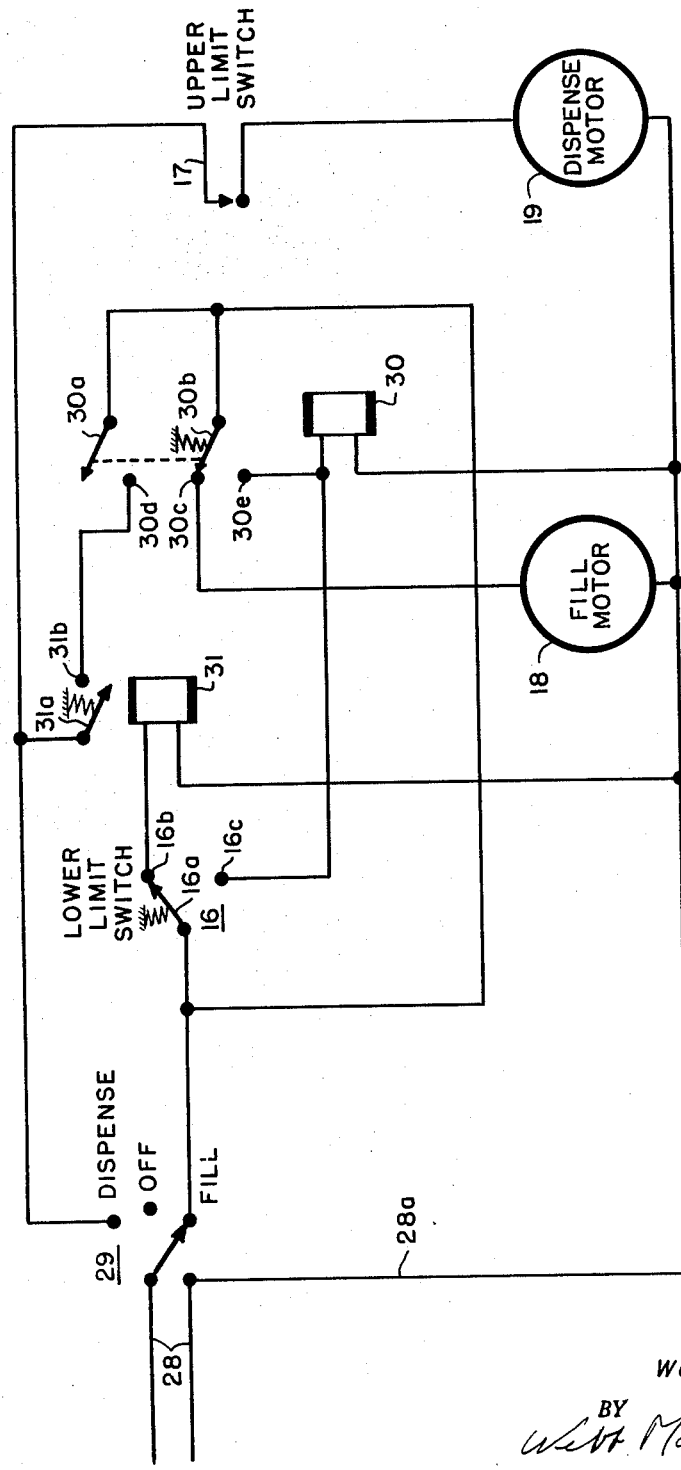
FIGURE 2 is an electrical diagram showing the electrical circuit for controlling the movement of the apparatus shown in FIGURE 1.

FIGURE 2 shows the electrical circuit. Referring to FIGURE 2, a source 28 of current has a common connection 28a to the various components in the circuit as shown. The other side of the source 28 is connected to a switch 29 which can be moved to actuate either the motor 18 or the motor 19 or be placed in an "off" position. The switch 29 can be actuated manually or, if the syringe is part of an automatic titrator, the switch 29 can be actuated by signals sent from other elements in the titrator.

To explain the circuit of FIGURE 2, it will be assumed that the plunger 7 is at the top of its stroke in the cylinder 6 and the switch 29 has been moved to the fill position. As shown in the diagram, this supplies current to the arms 30a and 30b of a relay 30 which is spring loaded to be in the position shown in FIGURE 2 when the relay 30 is not activated. The arm 30b through the contact 30c supplies current to the motor 18 which drives the plunger on its fill stroke. The limit switch 16 is spring loaded to be in the position shown in FIGURE 2 so that during the fill stroke of the plunger, the bottom limit switch 16 is in its inactive position and current flows through an arm 16a of the limit switch to a contact 16b and activates a relay 31. The relay 31 has an arm 31a which is spring loaded to close with a contact 31b. When the relay 31 is energized, this contact is opened.

When the nut 10 reaches the end of its downward travel on the lead screw 11, the arm 13, extending from the nut, activates the lower limit switch 16 so that the arm 16a of this switch engages a contact 16c and breaks the contact of the arm with contact 16b. This deenergizes the relay 31 and closes the contact between arm 31a and contact 31b. Movement of the switch 16 also energizes the relay 30 and closes the arm 30a of the relay with a contact 30d and the arm 30b with a contact 30e. It should be noted that when the contact 30e is closed, relay 30 continues to be energized and keeps the relay in the closed position. Current then flows through the arm 30a, contact 30d, contact 31b and arm 31a to the motor 19 which drives the lead screw during the upward dispense movement of the plunger 7. The nut 10 then begins to rise, but immediately the arm 13 is lifted from the limit switch 16 that switch goes to its inactive position in which the arm 16a engages the contact 16b which energizes the relay 31 and breaks the contact between the arm 31a and the contact 31b, thus cutting off the supply of current to the motor 19.

The limit switch 16 is a microswitch requiring very little movement to actuate it so that there is very little movement of the plunger in the dispense direction. In spite of the smallness of this movement, however, the syringe remains connected to the reagent supply until the movement is completed so that no reagent flows to the reaction cell during this movement.

The relay 30 remains closed due to the holding circuit through the arm 30b and contact 30e. It is not opened until the switch 29 is moved from the fill position. At that time, the arms 30a and 30b return to the position shown in FIGURE 2 and, since there is no current applied to relay 31 through switch 16, the arm 31a will make contact with 31b.

When desired, the dispense motor 19 can be energized to drive the lead screw 11 in a direction to raise the plunger 7 and thus dispense titrant from the syringe 5 by moving the switch 29 to the dispense position. As has been explained, the switch can be moved manually or by a signal received from some other element in the titrator.

The upper limit switch 17 is connected into the line between the switch 29 and the motor 19 as a safety precaution.

Figure 3:
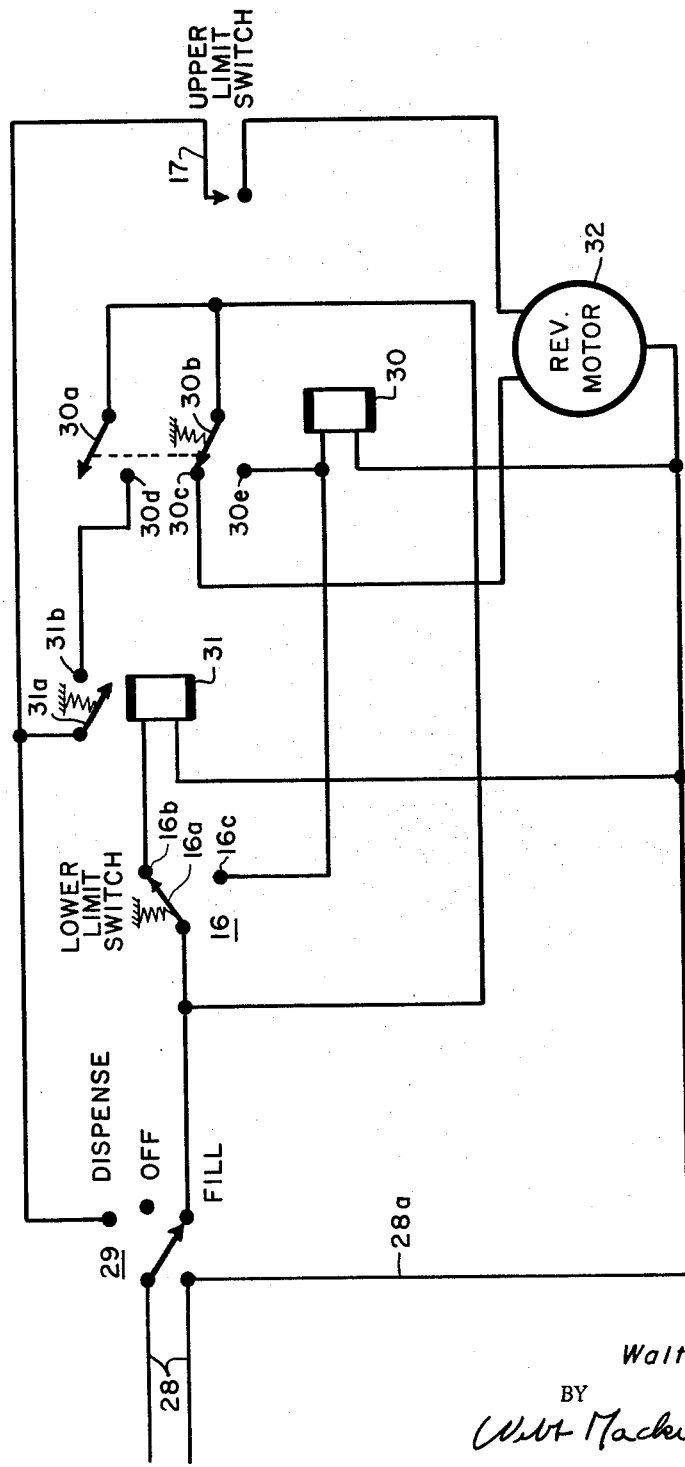
FIGURE 3 is an electrical diagram showing a modified form of apparatus and electrical circuit therefor.

FIGURE 3 shows a modified form of apparatus in which the two on-direction motors 18 and 19b in FIGURES 1 and 2 are replaced by a single reversing motor 32 having the conventional three connections whereby the motor can be driven in opposite directions. One of the connections is connected to the common connection 28a. Current is supplied alternately to the other two connections in order to cause the motor to rotate in one direction or the other. Thus, when the switches 16 and 29 are in the position shown in FIGURE 3, current flows through the arm 30b and contact 30c to a connection in the motor which will cause it to move the plunger 7 in the "fill" direction. When the switch 16 is actuated by the reciprocating element to move arm 16a to contact 16c, current flows through arm 30a, contact 30d, contact 31b and arm 31a and upper limit switch 17 to the contact on the motor 32 which will cause the motor to rotate in a direction to move the plunger 7 in the "dispense" direction.

It will be noted that when the plunger 7 is started upward to dispense titrant from the syringe, all slack has been taken out of the gearing forming the drive for the lead screw 11 and the gearing between the lead screw and the recording mechanism because, at the end of the fill stroke of the plunger, the direction of movement of the plunger is changed to the dispense direction and brought to the point at which the dispense stroke is to start while it is moving in the dispense direction. There is no lost motion in the gearing between the lead screw 11 and the recording mechanism which must be taken up before the recording mechanism is actuated to measure the volume of titrant delivered during a dispense stroke.

While I have described certain presently preferred embodiments of my invention, it is to be understood that it may be otherwise variously practiced within the scope of the appended claims.

I claim:

1. Apparatus in which an element moves in a reciprocating motion through gearing by an electric drive and in which the effect of backlash in the gearing when the element changes its direction of movement at one end of its path of travel is removed, said apparatus comprising the reciprocating element, a source of electric power, an electric drive for moving the element in both directions along its path of travel, gearing connecting the electric drive and the reciprocating element, an electric circuit including the source of electric power, the electric drive and a switch for reversing the direction of rotation of said electric drive, and means on said element for actuating said switch when said element is adjacent one end of its path of travel to reverse the electric drive and said gearing at said path end, thereby taking slack out of the gearing as the element moves away from said path end and to stop the drive after it has been reversed.

2. Apparatus in which an element moves in a reciprocating motion through gearing by an electric drive and in which the effect of backlash in the gearing when the element changes in its direction of movement at one end of its path of travel is removed, said apparatus comprising the reciprocating element, a source of electric power, an electric drive for moving the element in both directions along its path of travel, gearing connecting the electric drive and the reciprocating element, a circuit connecting said source and said drive and including a double throw switch having first and second contacts, means on said element to actuate said switch adjacent one end of the path of travel of the element, a first relay connected to the first contact of said switch, which contact is closed during movement of said element towards the end of its path of travel, said first relay when energized holding open the circuit between said source and the drive for said element when it moves away from the end of its path of travel, a second relay connected to the second contact of said switch, which contact is closed when said element actuates said switch at the end of the path of travel of the element, said second relay when energized breaking the circuit between said source and the drive for moving said element toward the end of its path of travel, said first relay when deenergized closing the circuit between said source and the drive for moving the element away from the end of its path of travel, the switch actuating means on said element breaking said first contact on movement of said element towards and adjacent to the end of its path of travel and closing the second contact and on reverse movement breaking the second contact and closing the first contact whereby the drive for the element is reversed and then stopped.

References Cited in the file of this patent
UNITED STATES PATENTS

| | | |
|---|---|---|
| 1,549,438 | Blood | Aug. 11, 1925 |
| 2,809,736 | Hoover | Oct. 15, 1957 |
| 2,876,650 | Sangster | Mar. 10, 1959 |
| 2,916,931 | Cunningham | Dec. 15, 1959 |
| 2,952,190 | Barker et al. | Sept. 13, 1960 |